REMOTE CUTOFF FIELD EFFECT TRANSISTOR

Filed July 24, 1964

6 Sheets-Sheet 1

INVENTOR.
George C. Onodera

BY Mueller & Aichele

ATT'YS.

REMOTE CUTOFF FIELD EFFECT TRANSISTOR

Filed July 24, 1964

INVENTOR.
George C. Onodera
BY [signature]
ATT'YS.

REMOTE CUTOFF FIELD EFFECT TRANSISTOR

Filed July 24, 1964 6 Sheets-Sheet 3

INVENTOR.
George C. Onodera
BY
Mueller & Aichele
ATT'YS.

REMOTE CUTOFF FIELD EFFECT TRANSISTOR

Filed July 24, 1964 6 Sheets-Sheet 4

INVENTOR.
George C. Onodera
BY Mueller & Aichele
ATTYS.

REMOTE CUTOFF FIELD EFFECT TRANSISTOR

Filed July 24, 1964

INVENTOR.
George C. Onodera

BY Mueller & Aichele

ATT'YS.

INVENTOR.
George C. Onodera
BY Mueller & Aichele
ATT'YS.

United States Patent Office 3,358,195

Patented Dec. 12, 1967

3,358,195

REMOTE CUTOFF FIELD EFFECT TRANSISTOR

George C. Onodera, Phoenix, Ariz., assignor to Motorola, Inc., Franklin Park, Ill., a corporation of Illinois Filed July 24, 1964, Ser. No. 384,903
8 Claims. (Cl. 317—234)

This invention relates to the semiconductor art and particularly to remote cutoff devices of the field effect transistor type.

Remote cutoff devices are devices the amplifying ability of which tends to fall off with increasing signal strength and so these devices are well-suited for application such as automatic volume control in receivers or wherever else automatic gain control (AGC) is required. Such devices are well-known in the form of vacuum tube tetrodes but have no counterpart in field effect transistors. Since field effect transistors (FET's) draw little current and are ideally suited for incorporation into integrated circuits and microcircuits of various types, a remote cutoff FET would be an especially desirable device. While prior FETs demonstrate amplification which falls off with increasing signal strength, this action typically is not so as to be generally useful for most automatic gain control application.

Reference will be made to the well-known FET electrical characteristics, pinchoff voltage $V_p$ and cutoff voltage $V_c$. Both $V_p$ and $V_c$ are functionally related to the thickness of the current carrying channel of the FET. FETs in accordance with this invention have two or more channel regions of different thickness so that the terms "pinchoff voltage $V_p$" and "cutoff voltage $V_c$" have a somewhat different relationship as used in this specification than is usually the case.

Pinchoff voltage refers to the value of the source-to-drain voltage at which the very high resistivity depletion or space charge region of th gate-channel PN junction expands sufficiently into the channel to bridge and just close it at the drain end of the channel. At this point, drain current is fairly constant for additional source-to-drain voltage.

Pinchoff voltage is difficult to measure as the drain current does have a finite increase with drain voltage after pinchoff so the exact value must be approximated.

The cutoff voltage which in theory is equal to pinchoff voltage, is the value of the source-to-gate bias at which the depletion region has expanded to sufficiently fill the channel as to render it practically non-conductive. $V_c$ is easy to determine since the source-to-drain current no longer flows at bias equal or greater than cutoff. Since it is easy to determine, the cutoff voltage $V_c$ is a more useful parameter than the pinchoff voltage $V_p$. Where a channel region has several thicknesses, each having a different pinchoff voltage, the term cutoff voltage with respect to the present invention will be the source-to-gate voltage at which all thicknesses are pinched off and the channel is everywhere closed with a continuous high resistivity depletion region so as to be non-conductive.

Accordingly, an object of this invention is to provide a field effect transistor having remote cutoff characteristics such that the transistor is suited for general AGC application.

A feature of this invention is a stepped channel design such that the channel pinches off partially at moderate gate bias but will not be pinched off entirely until a high value of gate-to-source bias has been reached.

Another feature is the provision of thick and thin regions of channel cross section with the thin regions longer than the thick to provide a high initial transconductance.

Yet another feature of this invention is a channel design having spaced and alternating high and low gate regions so that the channel approaches total pinchoff in a gradual and progressive manner.

Figure 1:
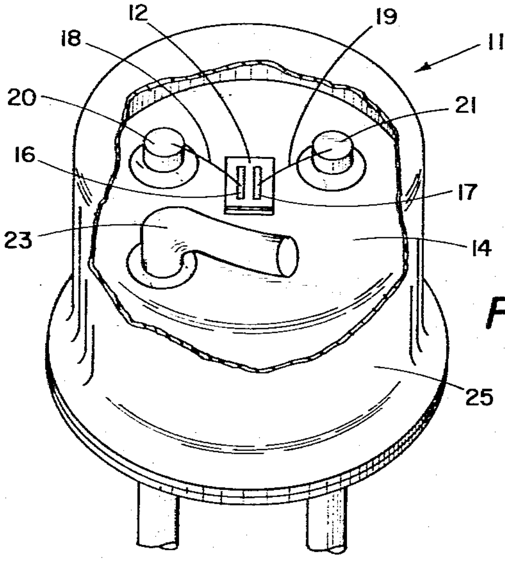
FIG. 1 is an enlarged cutaway view of a completed field effect transistor in accordance with this invention.
Figure 8:
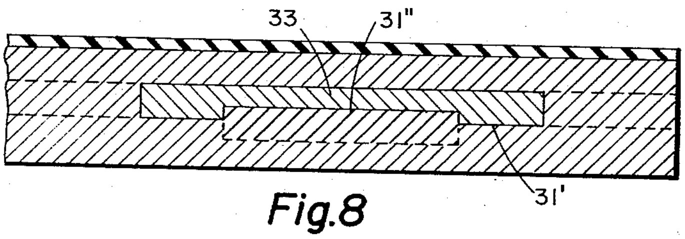
Figure 9:
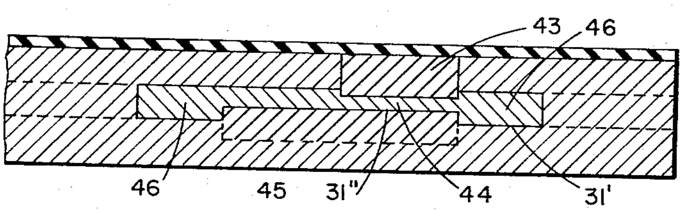

FIG. 8 and FIG. 9 each show alternate channel configurations in accordance with this invention; and FIGS. 10A through 10M show the results of the various processing steps used in fabricating the field effect transistor of FIG. 1.

Field effect transistors in accordance with this invention have transversely stepped channels so that the channel has two or more regions of different thicknesses each of which pinches off completely at a different voltage. The net result is an FET with a high initial transconductance and a high cutoff voltage as is desirable in a remote cutoff FET. In one embodiment the channel is so constructed that it pinches off initially at low gate voltage at a number of different points to form alternating open and closed portions of the channel and then with increasing bias, the open regions are progressively closed off to provide an extremely smooth and gradual reduction in gain with increasing gate voltage or increasing signal strength when the signal is applied across the gate and source.

The completed transistor 11 is shown in FIG. 1, which is an embodiment of this invention, is comprised of a semiconductor unit 12 which is soldered to a conventional three-lead header of the glass-to-metal seal type. Connections are made to the source and drain electrodes 16 and 17 of the FET by means of fine wires 18 and 19 connected to the tops of the leads 20 and 21 of the header. A third lead 23 which is shown bent over and shorted to the header 14 makes connection to the gate junctions of the FET by way of the bottom of the semiconductor unit 12. A hermetically sealed enclosure is provided by a cap 25 welded onto the header.

Figures 2, 3, 4:
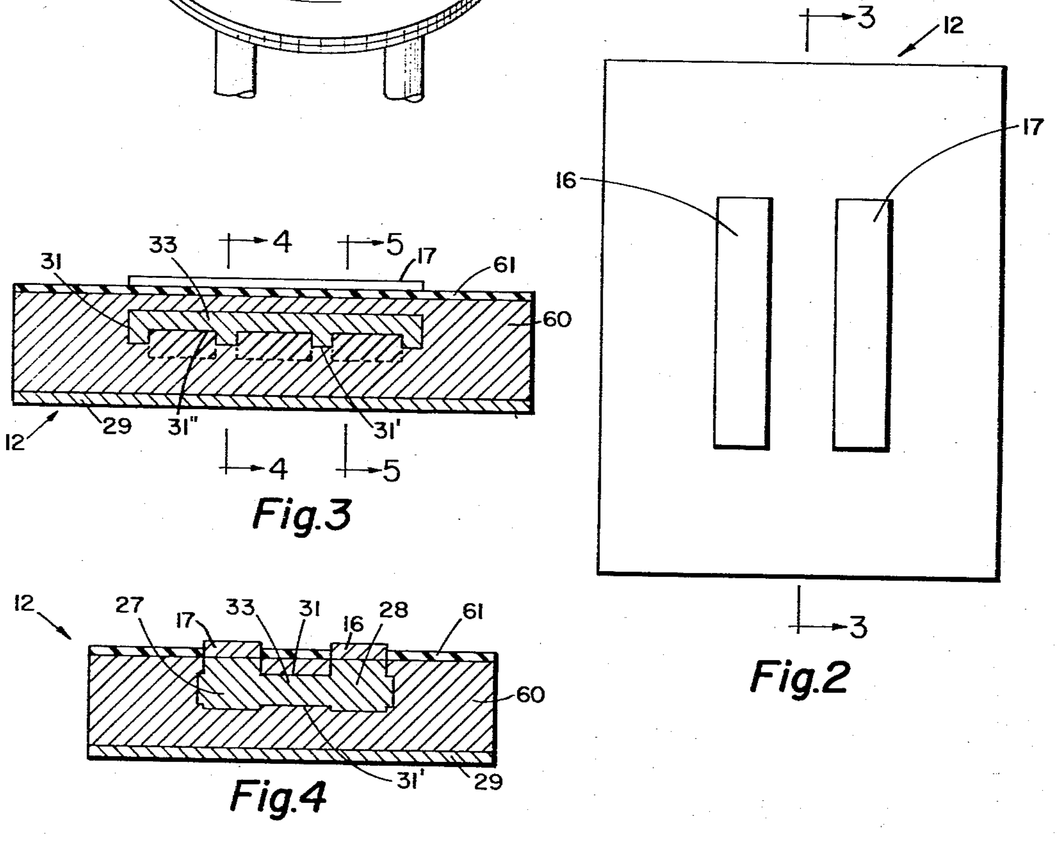
FIG. 2 is a top view of a semiconductor unit used in the field effect transistor of FIG. 1.
FIG. 3 is a cross sectional view of the semiconductor unit taken at section line 3—3 of FIG. 2.
FIG. 4 is a cross sectional view of the semiconductor unit taken at section line 4—4 of FIG. 3.
Figure 5:
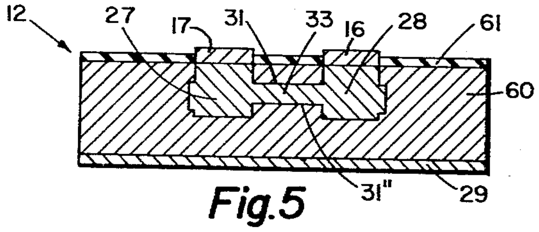
FIG. 5 is a cross sectional view of the semiconductor unit taken at section line 5—5 of FIG. 3.

The semiconductor unit 12 as shown in FIG. 2, is further shown in FIG. 3 in cross section taken at line 3—3, in FIG. 4 in cross section taken at line 4—4, and in FIG. 5 in cross section taken at line 5—5. The unit 12 includes a substrate 60 with the previously mentioned metal electrode regions 16 and 17 connected to the source 27 and drain 28 of the transistor. The source 27 and drain 28 are interconnected by the channel 33 as shown in FIGS. 4 and 5. The metallized region 29 on the bottom of the unit 12 serves to aid in making the soldered connection between the unit and the header and also provides connection to the gate PN junction 31 of the transistor. Note in FIG. 3 that the lower gate part of the junction 31 of the channel 33 of the transistor has a notched or castellated form across the direction of source-to-drain current flow. The channel 33 is substantially thicker along its length at the bottom 31′ of the notches than at the top 31″ as is apparent from sectional views of FIG. 4 and FIG. 5. This notched channel 33 provides the remote cutoff characteristic of the FET. The value of the stepped regions 31′ and 31″ in providing the desired AGC action may perhaps best be illustrated by considering gate voltage versus drain current curves (FIG. 6A through FIG. 6C) or (1) a field effect transistor having a high transconductance equivalent to an FET having a narrow channel and which therefore has a low cutoff voltage, (2) an FET having a thick channel and therefore a high cutoff voltage, (3) an FET with a narrow channel in parallel with an FET having a thick channel, and (4) an FET having the desired characteristic of an ideal remote cutoff device.

Figure 6A:
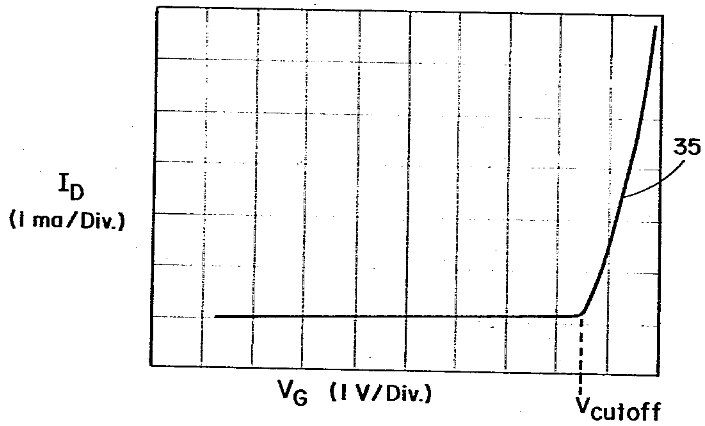
FIGS. 6A through 6C are drain current versus gate voltage curves for several different types of field effect transistors.

The first curve 35, FIG. 6A, for an FET of high initial transconductance, shows that the drain current $I_D$ falls away quite rapidly with increasing gate voltage $V_D$ until cutoff occurs at $V_c$.

Figure 6B:
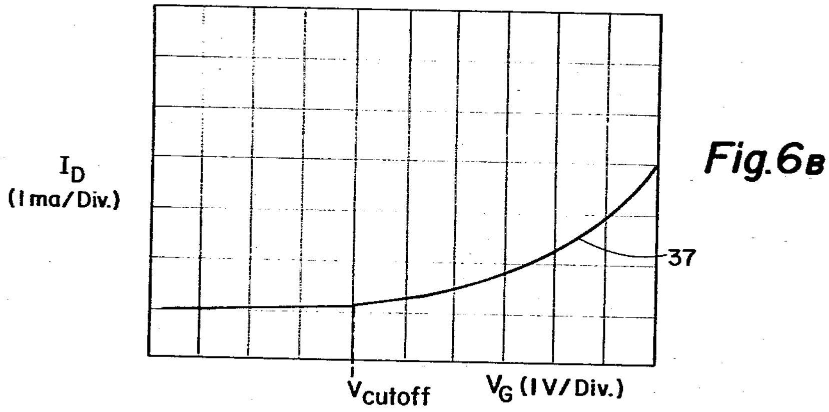

The second curve 37, FIG. 6B, shows a similar transistor but one having a thicker channel and in this device the drain current falls more slowly with increasing gate voltage, but the transconductance at low gate bias is rather poor and it is, therefore, unsuited for use as a remote cutoff device. An ideal remote cutoff FET would have a curve shaped like the smooth curve 39 shown in FIG. 6C. Note that initially drain current falls quite rapidly with increasing gate bias and then the $g_m$, i.e., the slope of the curve, falls off more slowly and more uniformly until cutoff occurs at a fairly high voltage which is substantially greater than that of the thin channel device of FIG. 6A. The curve 39 of FIG. 6C can be approached by connecting a field effect transistor having a narrow channel in parallel with one having a thick channel; the one with a narrow channel providing the high initial transconductance and the one having the thicker channel providing an increased final cutoff voltage. The curve 41 for such a pair of parallel FET's is shown also in FIG. 6C. However, the curve is not smooth because of V cutoff of the narrow channel FET in the parallel pair. A curve of this sort may be made to fit curve 39 by paralleling a large number of transistors each having progressively higher cutoff voltages until the desired shape has been achieved. However, this is obviously not an economical means of providing AGC.

Figure 6C:
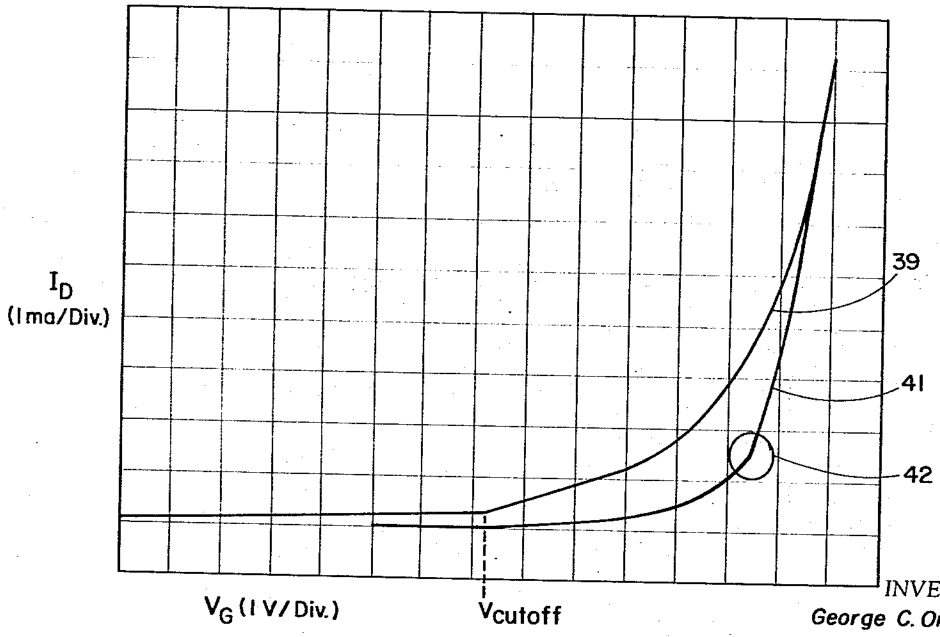
Figure 7:
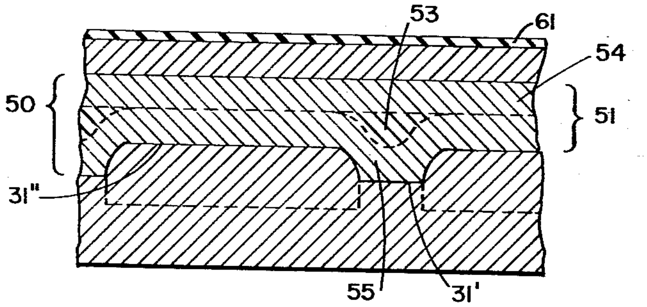
FIG. 7 shows the shape of the depletion region in the channel of the semiconductor unit.

The ideal curve 39 shown in FIG. 6C, as a matter of fact, is provided by FET's with channels 33 (FIGS. 3, 4 and 5) in accordance with this invention. The reason may be seen by referring to FIG. 7 which is an enlarged portion of the cross section of the channel 33 as it exists transversely to the direction of channel current flow through the FET. The transistor has two channel thicknesses 50 and 51 before gate bias is applied as measured from the top of the channel to 31' and 31''. The narrower part 51 of the channel pinches off at a low voltage and provides the higher initial transconductance. Because of its narrow width it is designed so as to have a higher aspect ratio than the thicker part. The transconductance of an FET is determined by its channel thickness, resistivity and aspect ratio. The aspect ratio is the quotient Z/L where L is the dimension of the channel in the direction of source-to-drain current flow and Z is the dimension of the channel other than its thickness in the direction perpendicular to the current flow. For otherwise similar FET's the transistor having the larger aspect ratio has the larger transconductance. This is most apparent where resistivity, L, and the channel thickness is equal for each device so that a larger aspect ratio represents a larger channel cross section and therefore a larger drain current of the same operating conditions. Under these conditions, a given change in gate voltage, while changing the effective cross section (that portion outside of the depletion region) of each channel in approximately the same percentage or proportion, causes a larger change in the actual amount of drain current in the device having the greater aspect ratio simply because it carries the largest amount of current and therefore $g_m$ is larger. These relationships are also substantially true in an FET having a channel with a cross section with different thickness dimensions as in FIG. 3. Neglecting the vertical sides of the castellations the aspect ratio of the narrower part of the channel is the sum of the widths (in the Z direction) on top of the castellations divided by its length as measured from source to drain on top of the castellations, and the aspect ratio of the thicker portion is the sum of the distances between adjacent castellations including of course the distances separating the first castellation from its adjacent side of the channel and the distance separating the last castellation from the side of the channel adjacent to it divided by the channel length.

There are several regions 53 not closed by the depletion regions 54 and 55 through which current may readily flow. These regions 53 close off with increasing bias in not only the vertical direction but in the horizontal direction as well due to the fact that the depletion region spreads away from the sides of the raised portions so that the spreading has a lateral as well as a vertical component. This kind of spreading of the depletion region allows the channel cross section, and therefore the channel current, to change in a greater amount with fluctuations in the gate voltage at higher gate bias voltage, and therefore, the $g_m$ continues to be rather large until near cutoff when the openings are more shallow and the change in the depletion region is largely due to vertical rather than to any horizontal spreading. The shape and smoothness of the curve may be adjusted empirically by changing the number of raised portions of the gate regions in the channel and their width and spacing.

A single raised portion 31'' in the channel as shown in FIG. 8 is roughly equivalent to two transistors in parallel and has little of the smoothness characteristics of curve 39, FIG. 6C. Its characteristic curve is in fact almost identical with that of curve 41 formed by connecting two field effect transistors in parallel. An alternative remote cutoff FET structure would be that shown in FIG. 9 in which a P type diffusion 43 forms a very thin channel region 44 which would be roughly equivalent to three transistors in parallel and has three channel thicknesses at regions 44, 45 and 46. This structure (FIG. 9) is quite difficult to make in practice and for this reason the structure shown in cross section of FIG. 3 is to be preferred.

The FET 11 with the preferred structure of FIG. 3 is not at all difficult to make. Fabrication begins with the provision of a substrate in the form of a wafer 60 (FIG. 10A) of P conductivity type silicon of approximately 0.5 ohm-centimeter resistivity. FET's in accordance with this invention are prepared in lots of one-hundred or more on each wafer of silicon; for convenience, in the drawings FIG. 10A through FIG. 10L only enough of a wafer 60 is shown to illustrate the fabrication of a single semiconductor unit 12.

Figure 10A:
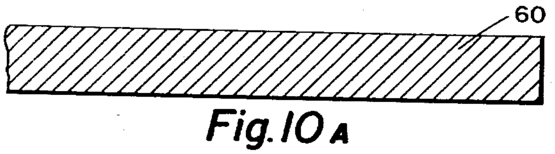
Figure 10B:
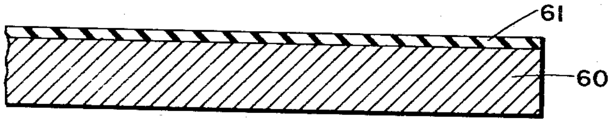
Figure 10C:
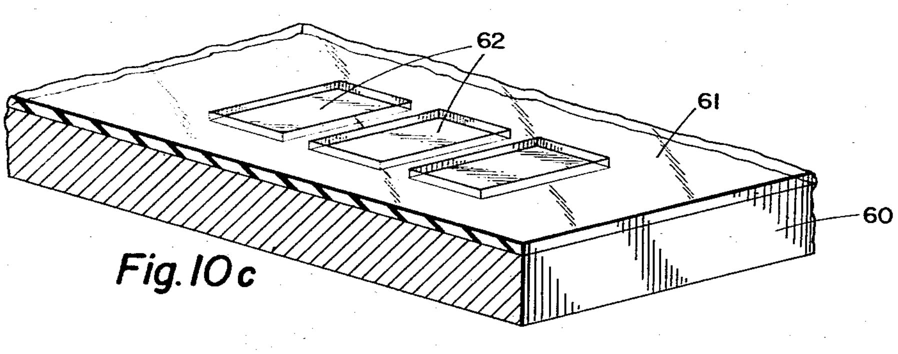
Figure 10D:
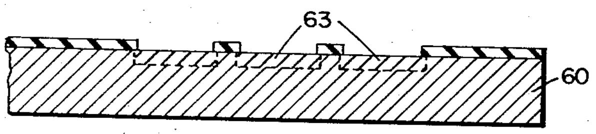

A thin layer 61 of silicon dioxide having a thickness of about 5000 angstroms is next deposited on the surface of the wafer 60 as shown in FIG. 10B. Subsequently, FIG. 10C, openings 62 are selectively etched in this layer using well-known photolithographic etching techniques and then, the P conductivity type impurity boron is selectively diffused into the silicon beneath these openings to form the shallow diffusions 63 (FIG. 10D) which have a surface concentration of about $2 \times 10^{18}$ atoms per cubic centimeter, and the concentration of the P type impurity of the silicon of the wafer 60 in the diffused regions is approximately doubled at a depth of 2 microns.

Figure 10E:
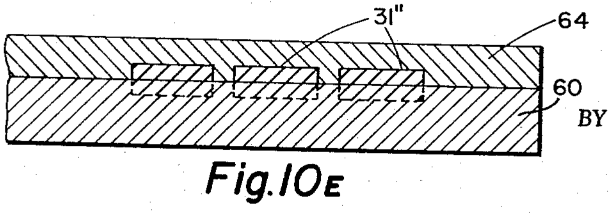
Figure 10M:
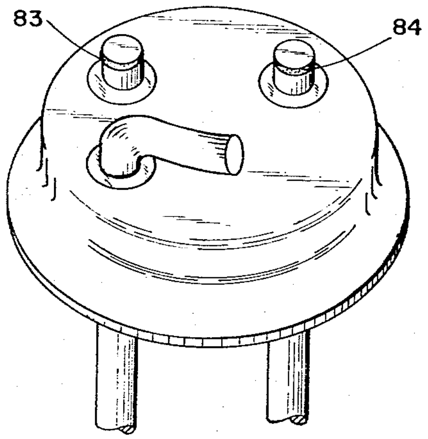

Subsequently, all of the oxide is etched away and a layer of N type silicon 64, FIG. 10E, of 1 ohm-centimeter resistivity and 3.5 microns thick is epitaxially grown on the upper surface of the substrate over the diffused regions. An elevated temperature of the epitaxial growing step causes the boron impurity to diffuse into the epitaxial material to form the raised portions 31'' (FIG. 10E). Both the substrate 60 and the raised portions 31'' form PN junctions with the epitaxial material 64.

Figure 10F:
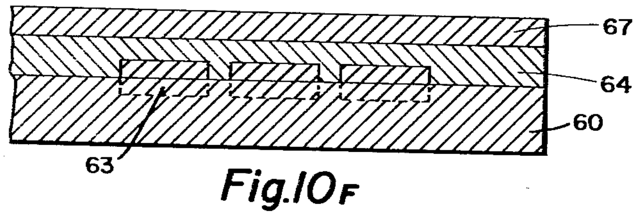
Figure 10G:
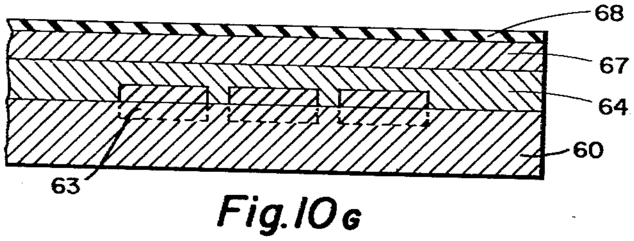
Figure 10H:
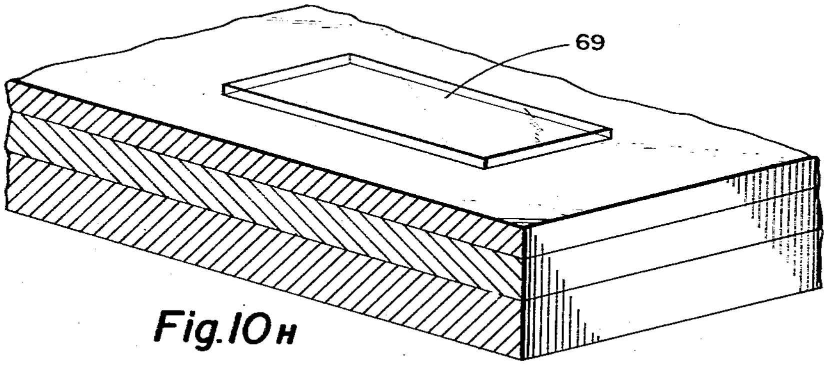
Figure 10I:
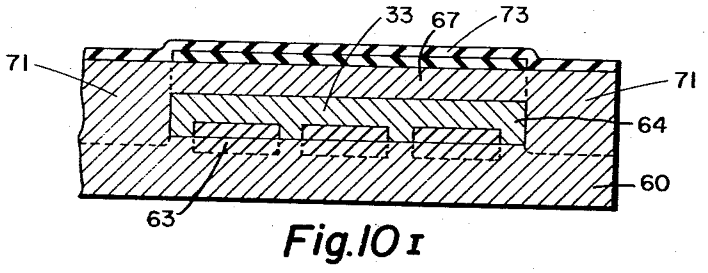

Subsequently, a layer of P type silicon 67, FIG. 10F, is epitaxially grown over the surface of the epitaxial N region 64. This layer 67 has a resistivity of 0.5 ohm-centimeter and is about 3 microns in thickness. This layer 67 forms a PN junction with the epitaxial layer 64.

In the next step, a layer of silicon dioxide 68 (FIG. 10G) is formed on the surface of the epitaxial layer 67. The thickness of this oxide is about 7000 angstrom units. Subsequently, the oxide is etched using photolithographic methods to form a rectangular shape 69 shown in FIG. 10H. This rectangular region will serve as a diffusion mask in the step to follow.

The P type impurity boron is diffused into the wafer in the regions not covered by the oxide 69 to shape the outer portions of the device. This region 71 (FIG. 10I) formed by the diffusion connects the upper 67 and lower 60 P regions and defines the N type channel 33 within the P type material. A layer 73 of silicon dioxide is then formed to recover the open regions or alternatively (not shown) all of the oxide is stripped away following the diffusion and a new layer of oxide is formed across the surface of the upper epitaxial layer 67.

Figure 10J:
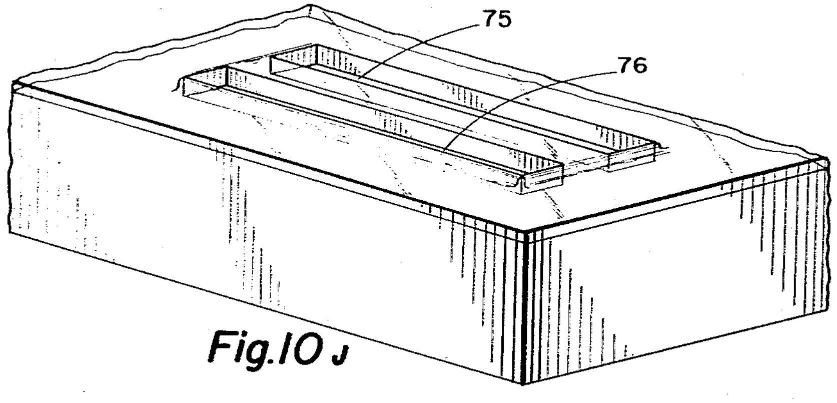

Two rectangular openings 75 and 76, FIG. 10J, are then photolithographically etched into the oxide layer 73 on the wafer. These openings are of the desired shape for the source 78 and drain 79 which will be formed in the next step by selective diffusion of the impurity phosphorus which is diffused into the silicon through these openings.

Figure 10K:
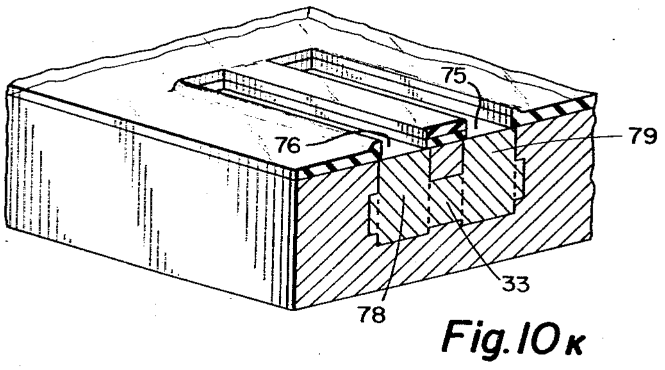
Figure 10L:
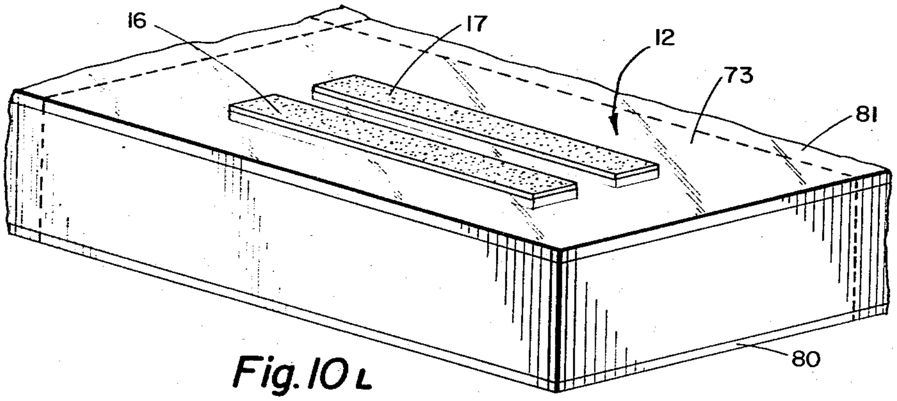

Following the diffusion step, the structure of the device is as shown in FIG. 10K with an N type source 78, an N type drain 79 and the interconnecting channel 33 between the source and the drain. A film (not shown) of oxide forms over the openings 75 and 76 during the source and drain diffusion. Using photolithographic techniques, the oxide is selectively removed from within the source and drain areas to reform the openings 75 and 76 to confine the metal to be deposited in the subsequent metallization step within the diffused areas to prevent shorting to the gate.

In the metallization step (FIG. 10L), aluminum metal is vacuum evaporated to form the electrodes 16 and 17 which fill the openings 75 and 76 and make contact with the source and the drain. A layer 80 of gold is then deposited by vacuum evaporation across the lower surface of the wafer to prepare the wafer for soldering to the header in a further step. The wafer is cut at the dashed line 81 into semiconductor units 12. The body of the header is gold plated to increase its solderability in preparation for the soldering step in which the semiconductor unit is bonded. Aluminum film 83 and 84 (FIG. 10M) is deposited on the header leads 20 and 21 in preparation for the subsequent wire bonding step wherein the tiny aluminum wire leads 18 and 19 (FIG. 1) are connected to the source and the drain electrodes 16 and 17 and the header leads 20 and 21.

The semiconductor unit is placed on the body of the header and during the soldering step the gold alloys with the silicon and it is the gold-silicon alloy which acts as the solder which bonds the semiconductor unit to the header. The presence of the gold on the silicon facilitates die attachment to the header; since it is in intimate contact with the silicon, it is not necesary to melt the gold to form the alloy and the soldering temperature need only be slightly above the gold-silicon eutectic of 370° C. rather than the melting point of gold which is 1063° C. This is below the aluminum-silicon eutectic temperature and thus, soldering may be accomplished without danger of the electrodes 16 and 17 melting and becoming deformed.

The fine aluminum wire leads 18 and 19 are pressure welded to the header leads 20, 21 and to the electrodes 16 and 17; and the device is tested and sealed and finally is as shown in FIG. 1.

The present invention is directed toward the fabrication of devices suitable for AGC, and field effect transistors may be made in accordance with this invention which are ideal for this purpose. More generally, it also provides a means for providing transistors in a wide variety of combinations of transconductance and cutoff voltage.

I claim:

1. A field effect transistor with a source region and a drain region, a channel connecting said source to said drain for conducting current from said source to said drain, said channel having at a cross section at least two regions of different thickness, said cross section being substantially constant between said source and drain regions and lying across the direction of flow of said current.

2. A field effect transistor with a source region connected to a drain region with a source-to-drain current carrying channel, said channel consisting of continuous thick and thin regions and having an overall cross-sectional area perpendicular to current flow in said channel, said thick and thin regions comprised of alternate and integral thick and thin areas lying in a plane perpendicular to current flow in said channel, said cross-sectional area being substantially constant in all portions of said channel between said source and drain regions, thereby imparting to said field-effect transistor a voltage-current transfer characteristic dependent upon the relatively high transconductance of the thin regions of the channel and the relatively low transconductance of the thick regions of the channel.

3. In a field effect transistor with source and drain regions of a given conductivity type, and a channel of said given conductivity type material connecting said source to said drain and adapted to carry current from said source to said drain, opposite conductivity gate regions extending into said given conductivity type material of said channel and forming a gate PN junction therewith so that said channel has at least two regions of different thickness as measured at a cross section of said channel between said source and said drain and across the direction of flow of said current from said source to said drain, said channel cross section being substantially constant from said source to said drain regions across the direction of channel current flow and imparting a voltage-current transfer characteristic to said field-effect transistor dependent upon the relatively high transconductance of one of the two regions of said channel and the relatively low transconductance of the other of the two regions of said channel.

4. In a field effect transistor with source and drain regions of a given conductivity type and a channel adapted to carry current from said source to said drain, alternating thick and thin regions of opposite conductivity type forming a gate junction with said channel, said thick and thin regions of opposite conductivity type having a continuous cross section transverse to the flow of channel current which is substantially constant between said source and drain regions.

5. A field-effect transistor having a source region, a drain region, and a channel region connecting said source and drain regions for conducting current from said source to said drain region, said channel region having one cross section in a plane transverse to the direction of current flow in said channel with alternating thick and thin areas of substantially constant cross section everywhere within said channel region between said source and drain regions and in each plane within said channel region transverse to the direction of flow of channel current.

6. A field-effect transistor having a source region, a drain region and a channel region formed by integral thick and thin regions interconnecting said source and drain regions for conducting channel current therebetween, said channel region having a substantially constant cross section between said source and drain regions, said cross section consisting of alternating thick and thin areas in a plane transverse to the direction of current flow in said channel, thereby producing a resultant voltage-current transfer characteristic for said field-effect transistor dependent upon a high transconductance in said thin channel regions and a relatively low transconductance in said thick channel regions.

7. A field-effect transistor including, in combination: a source region, a drain region, a variable width semiconductor channel means having an overall cross section of substantially constant area from said source to said drain regions and consisting of integral thick and thin areas lying in a plane perpendicular to current flow in said channel, said variable width semiconductor channel means providing a voltage-current transfer characteristic for said field-effect transistor which is dependent upon the relatively high transconductance of the thin channel regions and a relatively low transconductance of the thick channel regions, thereby producing a gate-to-source cut-off voltage for said field-effect transistor which is intermediate the cut-off voltages respectively of field-effect transistors having only thick and thin channel regions.

8. A field-effect transistor having a source region, a drain region, and a channel extending between said source and drain regions and formed by integral thick and thin regions, said thick regions interconnecting said source and drain regions for conducting channel current therebetween and said thin regions interconnecting said source and drain regions for conducting channel current therebetween, said channel having a cross section consisting of alternate thick and thin areas in a plane transverse to the direction of current flow in said channel, thereby providing a resultant voltage-current transfer characteristic for said field-effect transistor dependent upon a combination of a relatively high transconductance in said thin channel regions and relatively low transconductance in said thick channel regions.

References Cited

UNITED STATES PATENTS

| | | | |
|---|---|---|---|
| 2,764,642 | 9/1956 | Shockley | 317—235 |
| 2,869,055 | 1/1959 | Noyce | 317—235 |
| 3,056,888 | 10/1962 | Atalla | 317—235 |
| 3,148,284 | 9/1964 | Wertwijn | 317—235 |
| 3,165,430 | 1/1965 | Hugle | 317—235 |
| 3,171,042 | 2/1965 | Matare | 317—235 |
| 3,183,128 | 5/1965 | Ottoleistiko | 317—235 |
| 3,206,670 | 9/1965 | Atalla | 317—234 |
| 3,223,904 | 12/1965 | Warner et al. | 317—235 |
| 3,227,896 | 1/1966 | Teszner | 317—235 |
| 3,249,828 | 5/1966 | Williams | 317—235 |
| 3,274,462 | 9/1966 | Pullen | 317—235 |
| 3,275,845 | 9/1966 | Csanky | 317—235 |

FOREIGN PATENTS

| | | |
|---|---|---|
| 1,349,963 | 12/1963 | France. |

OTHER REFERENCES

H. A. Stone: Theory and Use of Field Effect Tetrodes, Electronics, May 15, 1951, pp. 66 to 68.

JOHN W. HUCKERT, *Primary Examiner.*

A. J. JAMES, *Assistant Examiner.*